United States Patent [19]

Harrison, III et al.

[11] Patent Number: 5,642,484
[45] Date of Patent: Jun. 24, 1997

[54] PUMP TOP ADVERTISEMENT DISTRIBUTION AND DISPLAY SYSTEM WITH PERFORMANCE AND SALES INFORMATION FEEDBACK

[75] Inventors: Nathaniel C. Harrison, III, Atlanta; Jack Duncan, Jr.; Richard K. Marlette, both of Lawrenceville; Frank L. Lane; David N. Grocer, both of Dunwoody; Walter A. Patrick, Decatur, all of Ga.

[73] Assignee: Captive Communications, Inc., Atlanta, Ga.

[21] Appl. No.: 242,611

[22] Filed: May 13, 1994

[51] Int. Cl.$^6$ .................................................. G06F 17/60
[52] U.S. Cl. .................................................. 395/214
[58] Field of Search ................. 364/400, 401, 364/402, 403; 235/375, 381; 340/825.32, 825.35, 825.36; 348/10; 360/9.1

[56] References Cited

U.S. PATENT DOCUMENTS

| | | | |
|---|---|---|---|
| 4,054,752 | 10/1977 | Dennis, Jr. et al. | 360/9.1 |
| 4,853,678 | 8/1989 | Bishop, Jr. et al. | |
| 4,900,906 | 2/1990 | Pusic | 235/381 |
| 5,027,282 | 6/1991 | Hollidge | 235/381 |
| 5,091,713 | 2/1992 | Horne et al. | 235/381 |
| 5,099,319 | 3/1992 | Esch et al. | |
| 5,134,716 | 7/1992 | Craig | |
| 5,155,591 | 10/1992 | Wachob | |
| 5,295,064 | 3/1994 | Malec et al. | 364/401 |
| 5,305,195 | 4/1994 | Murphy | 364/401 |
| 5,327,066 | 7/1994 | Smith | 235/381 |
| 5,339,239 | 8/1994 | Manabe et al. | 364/401 |
| 5,354,974 | 10/1994 | Eisenberg | |
| 5,401,946 | 3/1995 | Weinblatt | 235/381 |
| 5,412,416 | 5/1995 | Nemirofsky | 348/10 |

OTHER PUBLICATIONS 78-6912-0395-0, 78-6912-0429-7, "Satellite Communications," Brochure, 3M Sound Products, St. Paul, Minnesota (1992, 1993).
Rickard, Leah, "Ads Find Premium Spot at New Gas Pumps," p. 10, (published after May 14, 1994).
Tenser, James, "3M Pushes Updated Store Audio System," p. 10 (Jun. 27, 1994).
William Stallings, Routing Algorithms for Internetworking: Getting From Here to There Over Networks, Bridges, and Routers; Dr. Dobb's Journal, v18, n4, p. 58. Apr. 1993.

*Primary Examiner*—Gail O. Hayes
*Assistant Examiner*—Steven R. Yount
*Attorney, Agent, or Firm*—James L. Ewing, IV; Kilpatrick Stockton LLP

[57] ABSTRACT

Point-of-sale information distribution and presentation systems which may be controlled centrally, hierarchically or as otherwise desired in order to distribute and display audio and/or visual information selectively. The systems comprise intelligent automated devices at the point-of-sale locations, such as service stations, which may be coupled or connected to a central location by modem, other land line, satellite, or as otherwise desired. Such systems may also measure and report information that relates to actual presentation of the information, exposure of customers to the information and, if desired, customer purchases associated with their exposure to the information. Moreover, these systems may be arranged to alter the distribution or presentation of information according to environmental sensing information at point-of-sale level regionally or nationally. Overrides may be included so that the system may be employed to notify appropriate authorities in the event of an emergency.

10 Claims, 7 Drawing Sheets

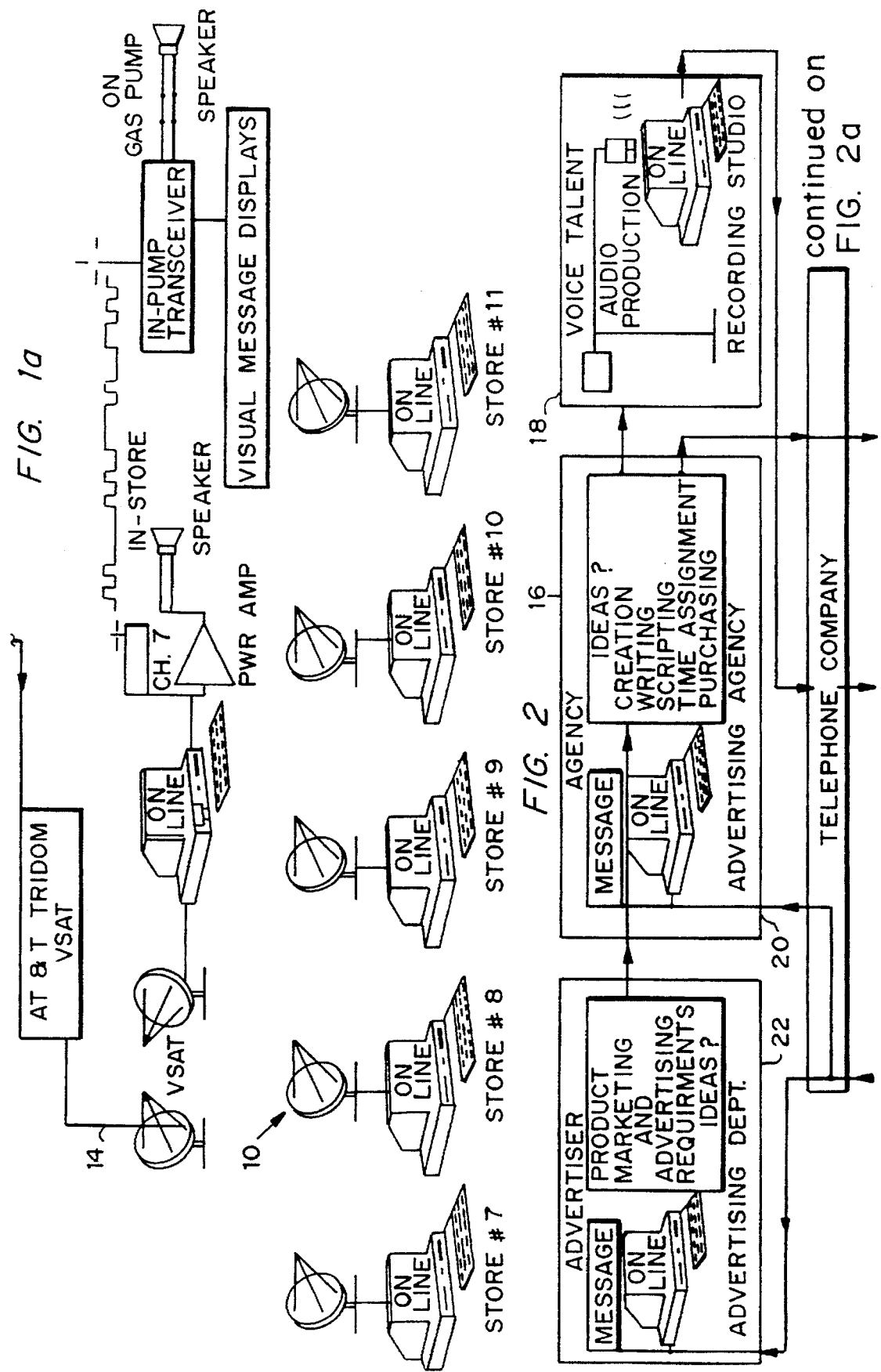

PUMP TOP ADVERTISEMENT DISTRIBUTION AND DISPLAY SYSTEM WITH PERFORMANCE AND SALES INFORMATION FEEDBACK

BACKGROUND OF THE INVENTION

Recent developments in information systems technology have created a wealth of new marketing opportunities. Cable television technology, as one example, has been the subject of recent developments which allow local operators to display local advertising during certain preselected portions of the broadcast programming. Similar are cable systems whose local advertising and programming may be fully or partially controlled from the uplink site or in a hierarchical fashion.

As additional broadband connectivity reaches the home and businessplace, interactivity becomes a larger issue; cable and other television industries are devoting significant research and development resources to interactive systems aimed at extracting demographic information from viewers and end users regarding what they are watching, the products they buy, and why they buy them. Customized presentation of information and interactivity has also reached print media, where newspapers feature sports lines, entertainment lines, and online connection for access to a broad range of information. Periodicals may be selectively bound, as another example, to include specialized types of advertising determined by zip code and, recently, even by mailbox, with the subscriber's name and address printed on envelopes and other promotional material contained within the periodicals. Those in electronic and print media can accordingly tailor their journalism and advertising product to individual audiences, and they and the advertisers may utilize feedback from the interactive aspects of the technology in order to tailor the presentation and advertising.

Direct point-of-sale locations have not yet directly benefited from these information systems techniques, however. One advance that has been made in that respect is provision of certain point of sale locations with cable programming or personal computer/compact disc-read only memory capacity that allows display of audio and/or visual information in the service station area and, if desired, on the service islands. However, these systems are dependent upon the cooperativeness of employees in ensuring that the programming or compact disc continues to play rather than being deactivated. Additionally, such CD systems do not lend themselves to control of programming from a central location directly or by groups of stations (hierarchically). Nor do they lend themselves to interactive capabilities, such as provision of real time information regarding advertising effectiveness or customer exposure for use by advertisers and others.

SUMMARY OF THE INVENTION

The present invention provides point-of-sale information distribution and presentation systems which may be controlled centrally, hierarchically or as otherwise desired in order selectively to distribute and display audio and/or visual information. The systems comprise intelligent automated devices at the point-of-sale locations, such as service stations, which may be coupled or connected to a central location by modem, other land line, satellite, or as otherwise desired. Such systems may also measure and report information that relates to actual presentation of the information, exposure of customers to the information and, if desired, customer purchases associated with their exposure to the information. Moreover, these systems may be arranged to alter the distribution or presentation of information according to environmental sensing information at point-of-sale level, regionally or nationally. Overrides may be included so that the system may be employed to notify appropriate authorities in the event of an emergency.

In a preferred embodiment of the invention, for instance, service stations contain conventional pc's which in turn contain processing, memory and communications capacity to receive and store digital information and present corresponding audio and/or visual information at the pump top. The signals may be provided to pump top displays using conventional radio links or they may be communicated via conventional wiring. The computers may be connected to a central location via conventional modem or satellite link for distribution of information and control signals. The pump top displays may additionally feature proximity sensors to measure customer exposure to advertisements, which information may be stored locally and uplinked to the service bureau together, if desired, with information relating to actual presentation of the information, and with sales information as desired for demographic study. Noise and environmental sensors located in the vicinity of each station may be coupled to the station computer via conventional serial port or as otherwise desired in order to alter the programming at predetermined noise levels and weather conditions such as preselected temperature or humidity thresholds. An operator switch behind the desk in the station causes the computer directly to telecopy a message to the nearest police station or other appropriate authority in the event of an emergency, or to notify the service bureau, or both. Local alarms may also be activated if desired.

It is therefore an object of the present invention to provide systems and processes for selective distribution and presentation of information at retail points-of-sale such as service stations.

It is an additional object of the present invention to provide information distribution and presentation systems and processes which may also be employed to provide actual presentation information, customer exposure and, if desired, sales information feedback that relates to the advertising which has been actually displayed.

It is an additional object of the present invention to provide information presentation and presentation systems and processes which can store and present information under central, hierarchical or local control as desired, and can provide feedback information relating to display of the advertising and, if desired, customer exposure and sales activity relating to the advertising actually displayed.

It is an additional object of the present invention to provide information distribution and presentation systems and processes which can selectively present information based on local environmental conditions.

It is an additional object of the present invention to provide information distribution and presentation systems and processes which may be utilized to provide programming directly from talent sources, agencies, and/or advertisers through a central location to retail points-of-sale for selective storage and display, and, if desired, to provide return demographic information relating to effectiveness of the information presented.

It is an additional object of the present invention to provide information distribution and presentation systems and processes which may utilize conventional communications links in order to communicate, store, display, and control flow of information ultimately displayed at point-of-sale locations.

DETAILED DESCRIPTION

Figure 1:
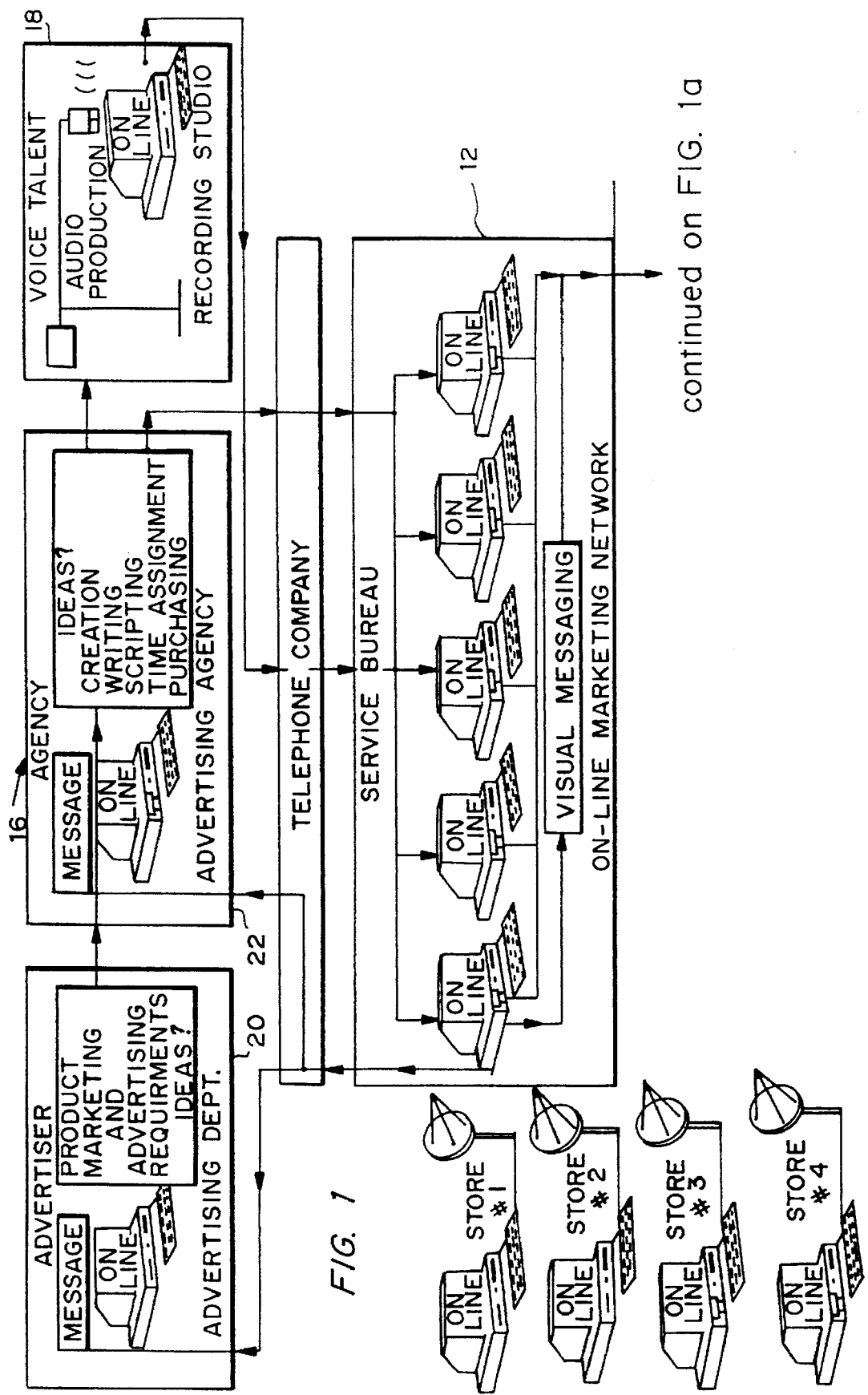
FIG. 1 is a schematic diagram showing various components of a first embodiment of systems according to the present invention.
Figure 2A:
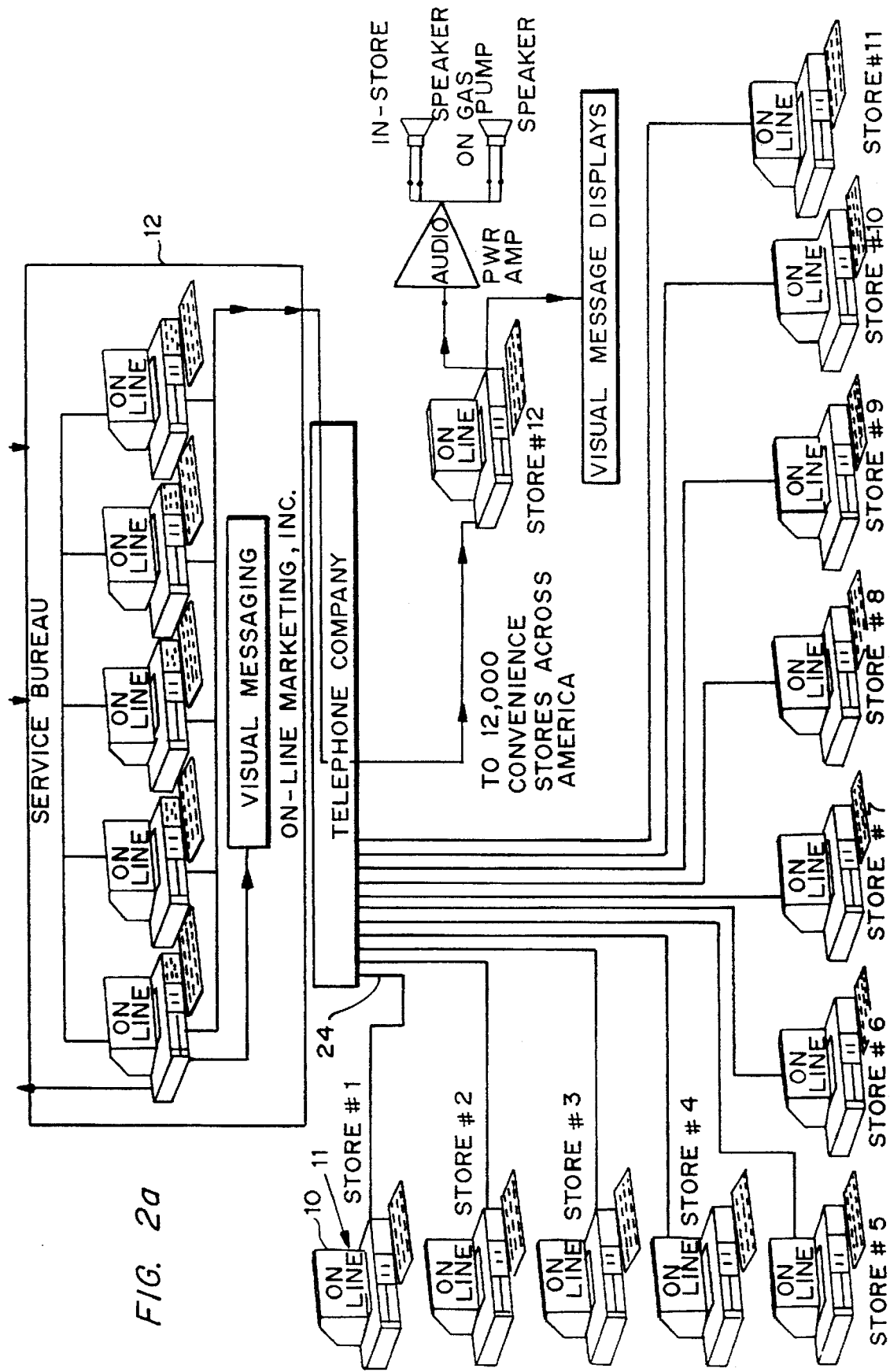
FIG. 2 is a schematic diagram showing various components of a second embodiment of systems according to the present invention.

FIG. 1 is a block diagram showing a first embodiment of information distribution and display systems according to the present invention. A plurality of automated devices 10 which may be conventional personal computers are linked to a service bureau 12 through appropriate conventional satellite links 14. The service bureau 12 may, but need not, be connected directly to information providers 16 such as talent 18, advertising agencies 20, or advertisers 22. Programming may accordingly be created at the information provider level, digitized there and communicated to the service bureau 12 via conventional serial/modem techniques, wide area network links or as otherwise desired. The information may be stored and processed as desired at the service bureau 12 and then disseminated through the satellite link to the automated devices 10. FIG. 2 shows a similar arrangement, except that the service bureau 12 is linked to the automated devices 10 via conventional serial links or commercial telephone company lines 24 as desired.

The service bureau 12 includes data storage, processing and input/output functionality that is adapted to receive files via communication links on disk or as otherwise supplied that contain programming and other information for ultimate distribution and presentation, either in original form or as modified at the service bureau 12 (or locally). In the preferred embodiment, for instance, the service bureau 12 employs conventional 486-based processing, appropriate disk space and input/output capacity in the form of modem, magnetic drive, or optical drive as desired for storage, communication and archiving. The service bureau 12 is also adapted to receive data relating to actual presentation of the information, such as number of times and times of day that certain advertisements were displayed, and other related information as desired from the automated devices 10, to store that data, and to report it as desired. Such processing, storage, communication, and reporting hardware capacity is conventional and may be implemented in conventional relational database applications as well running on Windows, Unix, DOS or other operating systems as desired.

Figure 4:
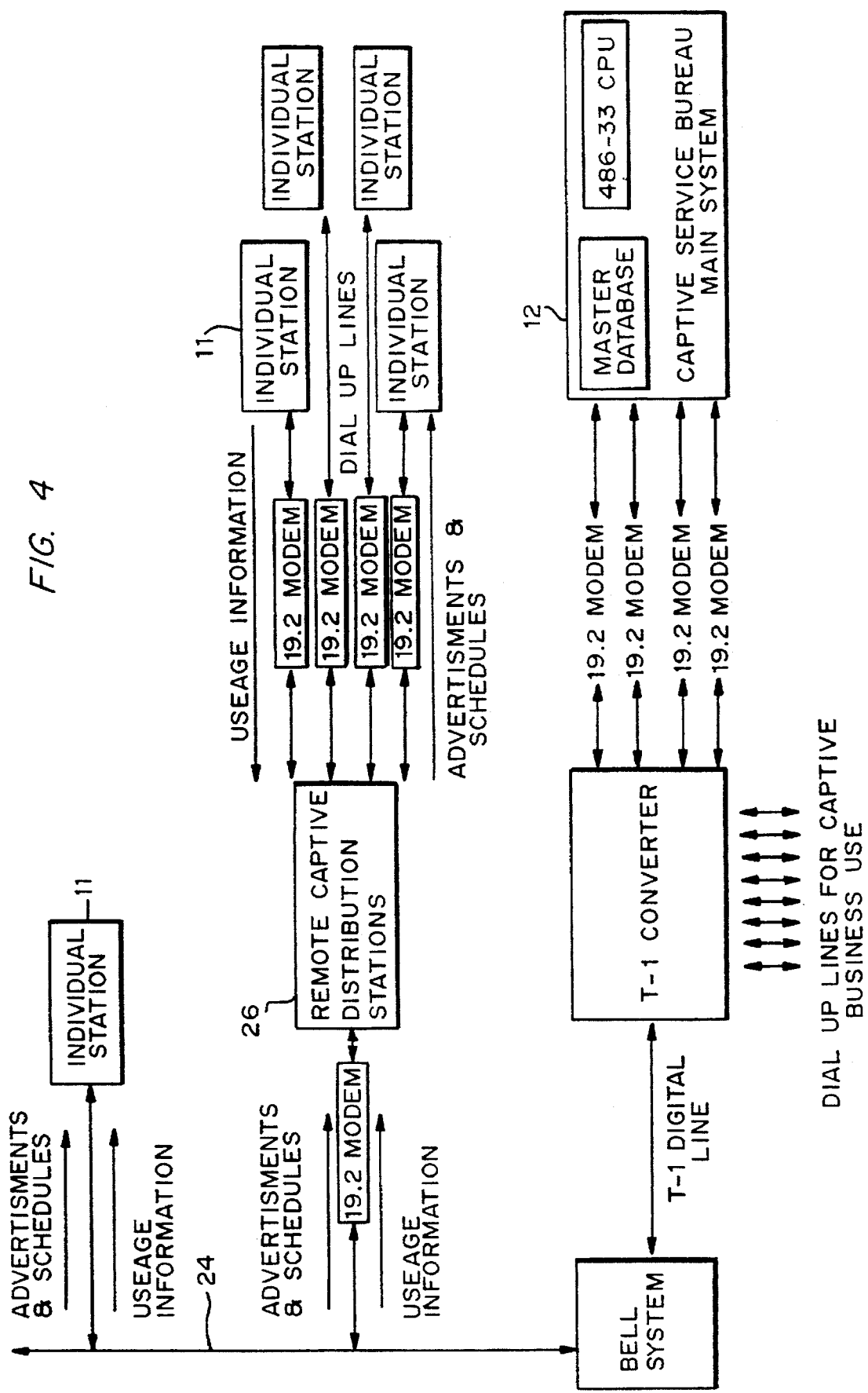
FIG. 4 is a block diagram showing communication and control arrangements and processes for distribution and presentation of information as controlled directly from a central service bureau and hierarchically.

The service bureau 12 may communicate via trunk (T1, fractional T1, on demand T1 or as otherwise desired), via standard commercial line, via satellite or as otherwise desired, consistent with the control arrangements shown in FIG. 4. There, the service bureau 12 is shown communicating directly with a number of automated devices whose information storage, processing, control, and display may be controlled directly from the service bureau 12. It also shows hierarchical control in which information may be distributed to remote control locations 26, which may be, for instance, a service station chain control location. That location may receive information and then control its storage, processing and display in real time or as otherwise desired at a number of individual locations 11 (service stations in FIG. 4) corresponding to automated devices 10.

Figure 3:
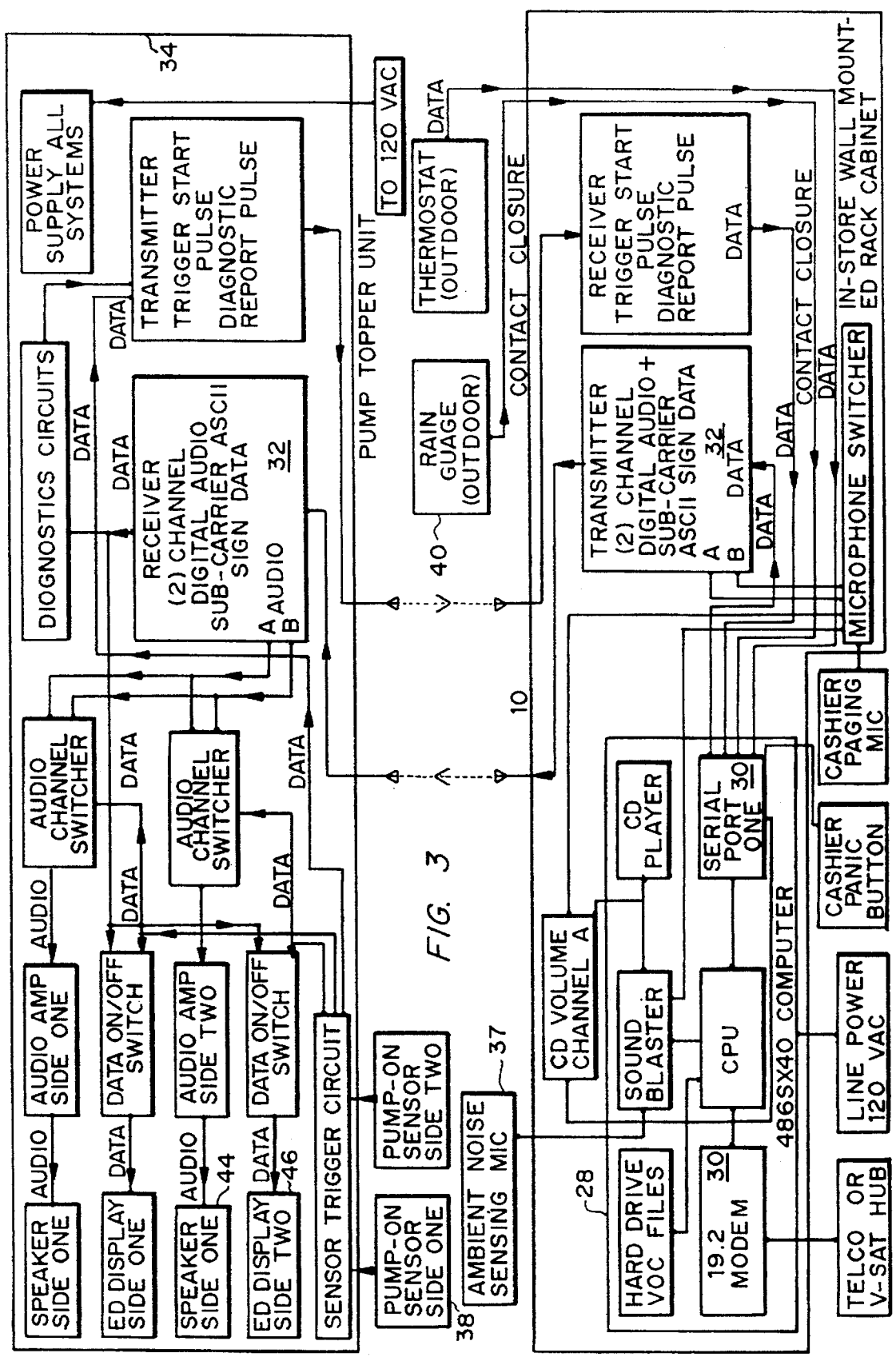
FIG. 3 is a block diagram showing components and interoperability of a service station point-of-sale local system according to the present invention.

FIG. 3 shows components and interoperability which may be featured at an individual location 11. Automated devices 10 are formed of, in that embodiment, a conventional 486-based computer with appropriate connectivity 30 in the form of a modem or other serial communication device or satellite hub as desired, and with display communications capacity 32 which may be conventional radio frequency transmitters/receivers whose mates are located in pump top display devices 34. Computers 28 include conventional processing, I/O, magnetic and optical data storage devices for storage, processing and display of audio and visual information across the display communications capacity 32 via pump top display devices 34.

Display devices 34 include mate transmitter/receiver capacity to communicate with automated device 10 (or are linked via standard wiring) in order to provide information to loudspeakers and appropriate displays through appropriate audio and visual display circuitry such as LED drivers and amplification circuits. Any desirable audio or video information may be displayed, inclusive of video if desired and if efficiency and cost considerations favor the necessary bandwidth capacity. A two channel audio switching circuit may be employed if desired, so that background programming may be switched to voice programming as controlled by proximity sensors as described below.

Control and display of information may be altered at the location 11 level dependent upon a number of factors. First, ambient noise sensors 37 located in the vicinity of the pumps or at the service station islands may be linked to the computer 10 in order to moderate audio volume of information presentation relative to the ambient noise. Additionally, proximity sensors 38 located in the vicinity of individual pumps or at service station islands (or, if desired, pump actuation sensors) may be employed to activate particular audio and visual displays and deactivate them after a certain period in order, for example, to control ambient noise. Such proximity sensors may be, for instance, conventional infrared or motion detectors. They could, if desired, be pump actuated sensors or switching devices.

Additionally, environmental sensors which sense and report environmental conditions such as humidity, rain, and/or temperature, may be linked via standard serial port techniques to automated devices 10 in order to display particular information during particular conditions. Windshield wiper advertisements, rain tire advertisements and similar ads may, for instance, be appropriate during rainy periods as sensed by environmental sensors 40 as shown in FIG. 3.

The local system may operate as follows. Until the detection of a customer via proximity sensors 38, the system presents background music or audio (and/or visual) information. When a customer is detected, the automated device 10 provides voice information to the relevant pump top display 34, such as a packet of advertisements. If a second customer approaches another pump, the proximity sensor 38 there causes that pump top presentation to switch to voice presentation as well. The information changes depending on input from ambient noise sensors 37 and environmental sensors 40.

Actuators such as a "panic button" may be connected to automated devices 10 as well in order to allow automated devices 10 either directly or through service bureau 12 to communicate with appropriate authorities such as providing an automatic telecopy to the police station via a conventional fax board in automated device 10 or through most direct links via service bureau 12.

Figure 5:
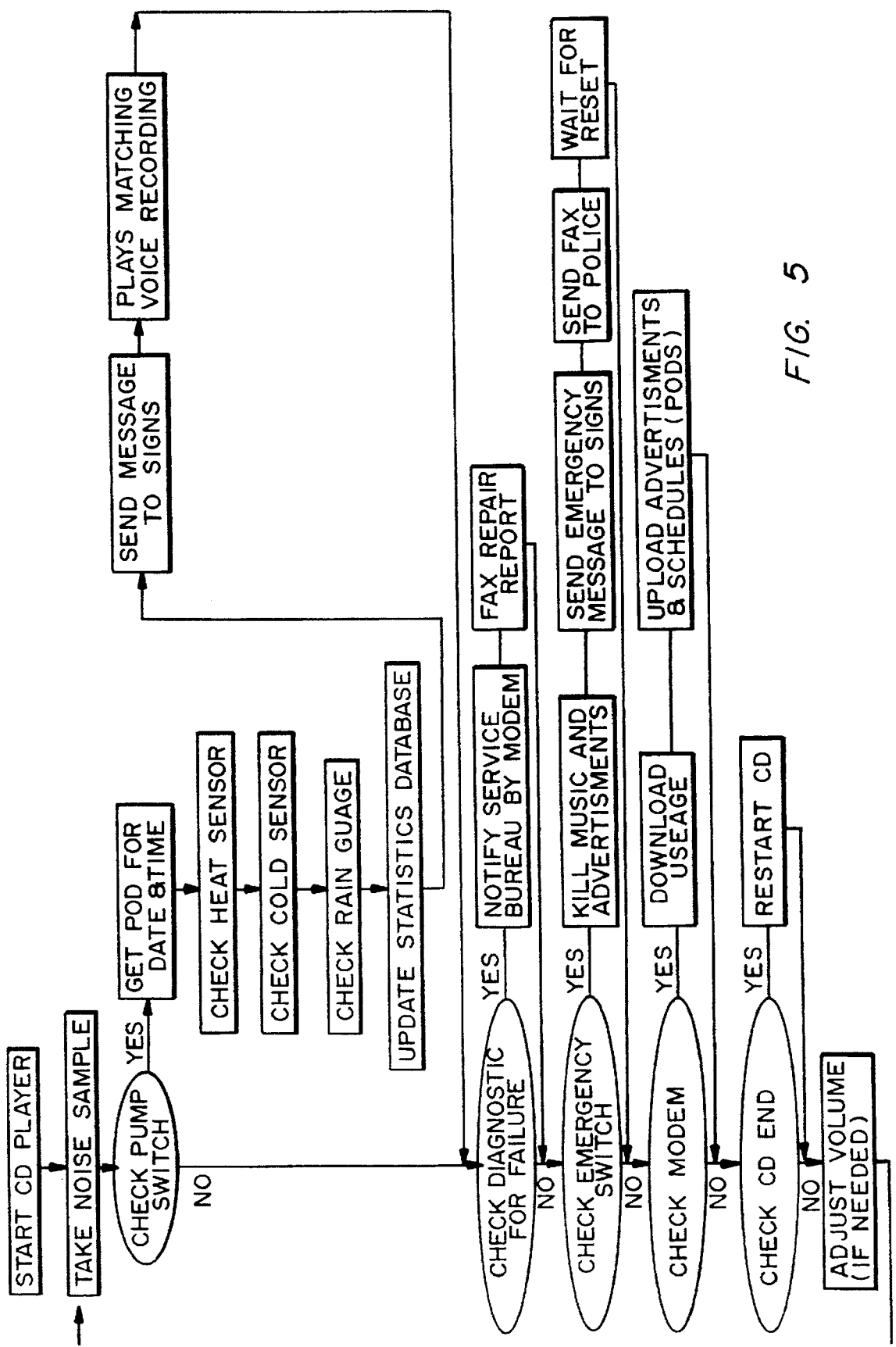
FIG. 5 is a flow diagram showing logic of point-of-sale programming in order to control local aspects of the information distribution and presentation.

FIG. 5 shows logic flow for software employed by a preferred embodiment of automated device 10. As shown in FIG. 5, the software loop initially actuates the CD/ROM storage for display, if desired, of background music or programming. The software may check ambient noise sensors 37 in order to adjust volume level at individual pump tops as desired and then poll individual proximity sensors 38 in order to determine whether customers are present. If they are, the software may retrieve, communicate to display devices 38 and thus present audio and/or video messages on display devices 34. The software may first check appropriate environmental sensors 40 in order to determine whether certain temperature, humidity, rain or other environmental thresholds have been met, and if so, retrieve and data files keyed to such thresholds and present information corresponding to those files. If the pump proximity sensors 38 indicate presence of no customer or if message display has occurred, the software runs diagnostics in conventional fashion and notifies service bureau 12 via appropriate links or via telecopy. Once such reporting has been accomplished, or if the diagnostic checks determine that there are no failures, the software polls actuators 42 in order to determine whether emergency conditions exist. If they do, the software may disable display of information as desired and send an emergency message to appropriate authorities. It may, if desired, send emergency messages to the pump top display devices 34 as well. Alternatively, such actuation may simply send a message to appropriate authorities without giving local clues that they have been notified. If appropriate emergency messages have been sent, or if no emergency exists, the software checks for incoming information from the service bureau 12, downloads it, stores it in appropriate locations and, if desired, uploads appropriate information to the service bureau 12. That information may include counts of ads or other information actually displayed, such counts keyed to proximity sensor readings in order to provide customer presence information, any or all of which may be keyed to sales information as desired. That sales information also may be communicated to service bureau 12 or other entities via separate channels, and the reporting capabilities of the systems according to the present invention may be keyed to such reporting capacity to tie it to actual sales information.

The software then checks to see if the compact disk has played through, in which event it is restarted or reloaded as desired. The loop then iterates with a volume adjust according to the ambient noise sensor 37.

Figure 6:
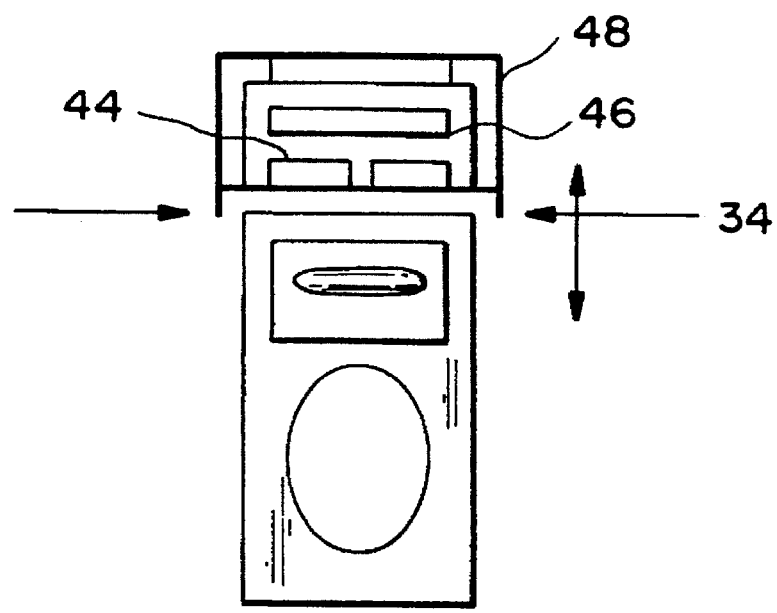
FIG. 6 is a schematic diagram showing a pump top display according to the present invention.
Figure 7:
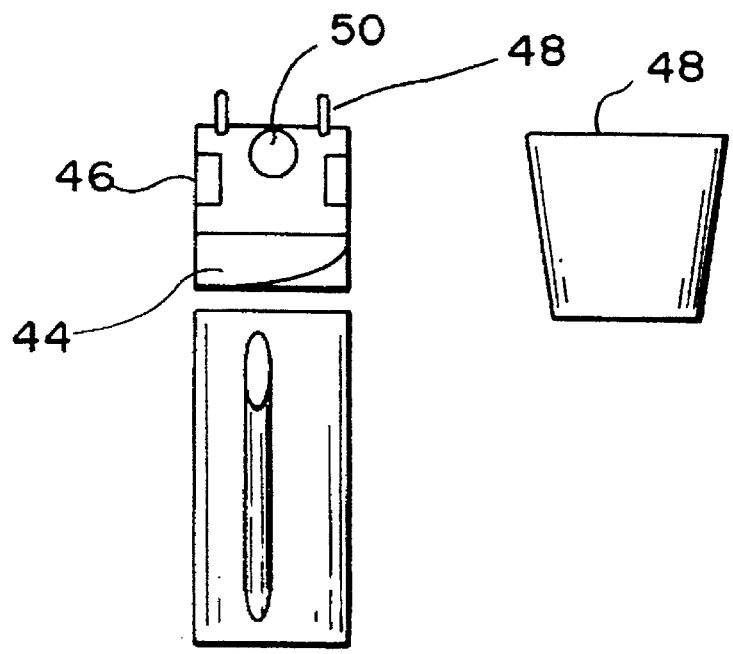
FIG. 7 is a schematic showing the side view of the display of FIG. 6.

FIGS. 6 and 7 show a schematic of a pump top display device 34 according to the present invention. The device 34 may contain appropriate speakers 44, LCD, LED, video, or other visual display 46. A sunshield 48 and/or fan 50 may be employed to maintain an appropriate environment for electronics contained in display devices 34.

Systems according to the present invention thus provide the sort of information and advertising presentation which can stimulate impulse buying at service stations and convenience stores. Systems according to the present invention are also appropriate for other point-of-sale locations such as supermarket and pharmacy checkout counters, waiting areas, ATM machines, public rest rooms, convenience restaurants, airline terminals, and other appropriate locations. As information systems processing techniques evolve to provide greater bandwidth, systems and processes according to the present invention may be adapted to be implemented in multi-media techniques. These types of modifications, together with other upgrades, changes, revisions, new versions and/or migrations to new platforms, software, architecture, protocols or standards may be implemented without departing from the scope or spirit of the present invention.

What is claimed is:

1. Apparatus coupled to a service bureau and for selectively presenting, using at least one display device, information originating with one or more information providers and included in a plurality of files maintained by the service bureau, comprising:

a. an automated device adapted to receive the plurality of files from the service bureau corresponding to the information, store the files and selectively disseminate data corresponding to the files to the at least one display device;

b. at least one sensor located in the vicinity of one of the at least one display device for sensing environmental conditions in that vicinity;

c. a plurality of communications links, the automated device and each of the at least one display device connected by one of the plurality of links, the automated device and each of the at least one sensor connected by one of the plurality of links, and at least one link connecting the automated device and the service bureau; and d. means contained in the automated device for varying the information content of the data disseminated to the at least one display device according to information received from the sensors.

2. Apparatus according to claim 1 further comprising the service bureau, the service bureau connected to the automated device and also in communication with the one or more information providers.

3. Apparatus according to claim 1 in which the automated device is further adapted to generate and store performance information relating to the information actually displayed and to report such information to the service bureau.

4. Apparatus according to claim 2 in which the information providers include at least one talent source and the automated device is further adapted to receive information from the at least one talent source.

5. Apparatus according to claim 2 in which the information providers include at least one advertising agency and the automated device is further adapted to receive information from the at least one advertising agency.

6. Apparatus according to claim 1 in which the at least one communication link connecting the automated device and the service bureau is a land line link.

7. Apparatus according to claim 1 in which the at least one communication link connecting the automated device and the service bureau is a satellite link.

8. Apparatus according to claim 1 in which the information contains audio and visual information.

9. Apparatus according to claim 1 in which the communication links are radio links.

10. Apparatus according to claim 1 in which the communications links comprise wiring.

* * * * *